United States Patent
Murao

(10) Patent No.: US 9,100,419 B2
(45) Date of Patent: Aug. 4, 2015

(54) LONG-TERM SIGNATURE TERMINAL, LONG-TERM SIGNATURE SERVER, LONG-TERM SIGNATURE TERMINAL PROGRAM, AND LONG-TERM SIGNATURE SERVER PROGRAM

(75) Inventor: Shinichi Murao, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 151 days.

(21) Appl. No.: 13/985,582

(22) PCT Filed: Dec. 8, 2011

(86) PCT No.: PCT/JP2011/078449
§ 371 (c)(1),
(2), (4) Date: Aug. 15, 2013

(87) PCT Pub. No.: WO2012/114603
PCT Pub. Date: Aug. 30, 2012

(65) Prior Publication Data
US 2013/0326633 A1    Dec. 5, 2013

(30) Foreign Application Priority Data
Feb. 23, 2011 (JP) ................................ 2011-037382

(51) Int. Cl.
*H04L 29/06* (2006.01)
*H04L 9/32* (2006.01)

(52) U.S. Cl.
CPC ............ *H04L 63/123* (2013.01); *H04L 9/3247* (2013.01); *H04L 9/3297* (2013.01); *H04L 2209/68* (2013.01)

(58) Field of Classification Search
CPC ..... G06F 21/83; H04L 9/3247; H04L 9/0825; H04L 63/123; H04L 9/3294
See application file for complete search history.

(56) References Cited

U.S. PATENT DOCUMENTS 7,975,145 B2 *  7/2011 Tanaka .......................... 713/178
8,108,906 B2 *  1/2012 Miyazaki et al. ................. 726/2
8,561,201 B2 * 10/2013 Kanai .............................. 726/26
(Continued)

FOREIGN PATENT DOCUMENTS

WO    WO 2004079986 A1 *   9/2004  ................ H04L 9/32

OTHER PUBLICATIONS

International Search Report mailed Feb. 7, 2012 issued in International Appln. No. PCT/JP2011/078449.
(Continued)

*Primary Examiner* — Harunur Rashid
*Assistant Examiner* — Sher Khan
(74) *Attorney, Agent, or Firm* — Adams & Wilks

(57) ABSTRACT

A long-term signature system acquires electronic signature data for each of a series of pieces of original data, transmits the acquired electronic signature data to a predetermined server, and acquires a time stamp issued for the electronic signature data from the predetermined server. Verification information is acquired for verifying the electronic signature data and the time stamp from a predetermined server. Long-term signature target data for confirming unfalsification of the original data, the electronic signature data, the time stamp, and the verification information is acquired for each of the pieces of original data. The acquired long-term signature target data is transmitted to a predetermined server, and long-term signature data having an archive time stamp issued for the long-term signature target data applied thereto is acquired.

5 Claims, 6 Drawing Sheets

(56) References Cited

U.S. PATENT DOCUMENTS

| | | | |
|---|---|---|---|
| 8,621,222 B1* | 12/2013 | Das | 713/176 |
| 2003/0233552 A1* | 12/2003 | Baldwin et al. | 713/176 |
| 2005/0125656 A1* | 6/2005 | Mallal et al. | 713/156 |
| 2006/0075245 A1* | 4/2006 | Meier | 713/176 |
| 2006/0206712 A1* | 9/2006 | Dillaway et al. | 713/176 |
| 2013/0132718 A1* | 5/2013 | Agrawal | 713/158 |

OTHER PUBLICATIONS

Patent Abstracts of Japan, Publication No. 2005-142661, publication date Jun. 2, 2005.

* cited by examiner

[FIG.2]

FIG.3
(a)
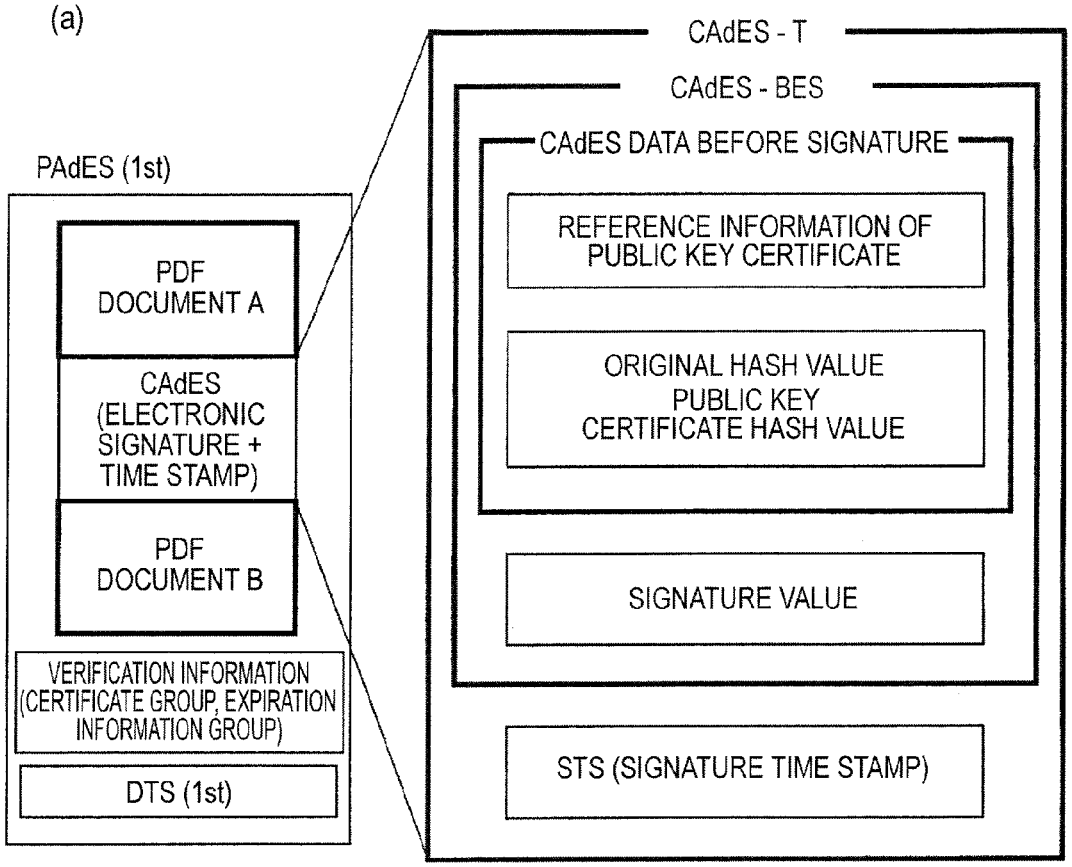
(b)
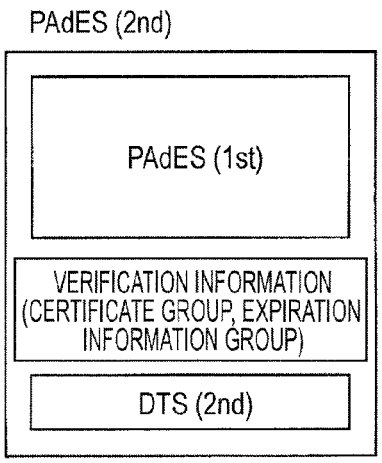

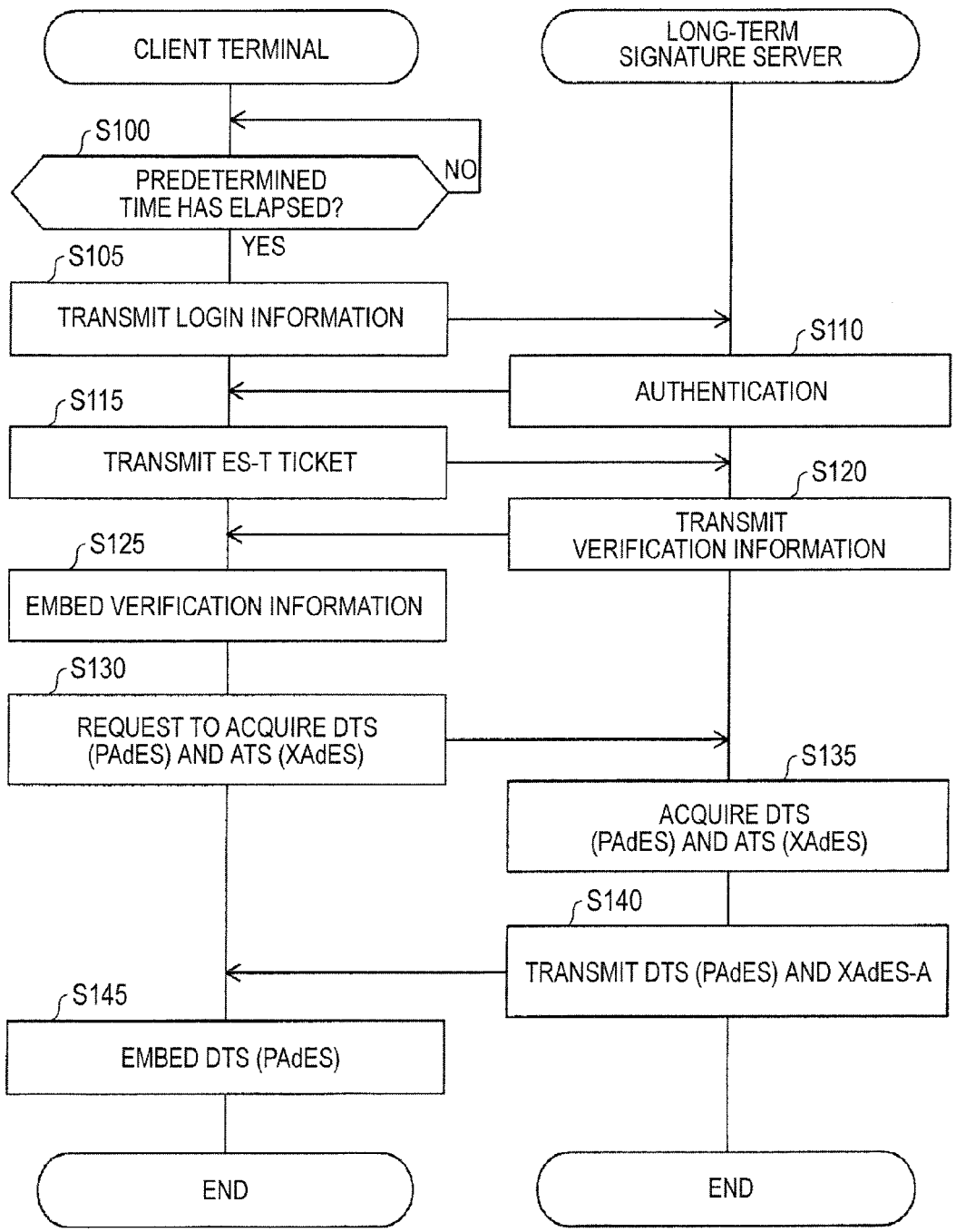

LONG-TERM SIGNATURE TERMINAL, LONG-TERM SIGNATURE SERVER, LONG-TERM SIGNATURE TERMINAL PROGRAM, AND LONG-TERM SIGNATURE SERVER PROGRAM

BACKGROUND OF THE INVENTION

1. Technical Field

The present invention relates to a long-term signature terminal, a long-term signature server, a long-term signature terminal program, and a long-term signature server program, and for example, to a technique for creating long-term signature data.

2. Background Art

In order to certify unfalsification (authenticity) of electronic data, an electronic signature is widely used in which electronic data is encrypted with a secret key to perform the electronic signature, and then electronic data is decrypted with a public key corresponding to the secret key to verify the electronic signature.

Electronic data is decrypted with the public key, and thus it can be confirmed that electronic data is encrypted with the secret key corresponding to the public key. However, since a signatory has the secret key, it can be certified that electronic data is generated by the signatory. For example, the secret key functions as a seal, and the public key functions as a certificate of the seal.

The public key is distributed by a public key certificate which is issued by a certificate authority, and when the public key is distributed, the authenticity of the public key can be confirmed by the certificate.

Meanwhile, the electronic signature has an expiration date which is set so as to cope with a compromise or the like of an encryption algorithm used in the signature or the like.

Even before the expiration date, the electronic signature may be expired according to signatory's convenience or all certificates following a root certificate may be expired if the secret key is omitted.

Accordingly, in order to cope with the above-described problem, as in PTL 1, an electronic signature format (hereinafter, referred to as long-term signature format) for perpetuating the validity of an electronic signature is specified.

In the long-term signature format, an archive time stamp which is a time stamp having an expiration date longer than an electronic signature is applied to original data and the electronic signature, thereby securing the legitimacy of the electronic data even after the expiration date of the electronic signature has elapsed.

Before the expiration date of the archive time stamp elapses, a second-generation archive time stamp having an expiration date longer than the archive time stamp is applied to extend the expiration date. Hereinafter, the expiration date is extended to the third-generation, the fourth-generation, . . . , making it possible to verify unfalsification of original data over a long period of time.

In the related art, in order to receive a long-term signature service, a user needs to deliver a secret key for signature or original data to a long-term signature service provider, and there is a problem in that confidential information (secret key and original data) should be sent to the outside.

Otherwise, when performing a long term signature on a plurality of pieces of original data while retaining confidential information on the user side, that is, when the user performs a long-term signature without receiving the long-term signature service, there is a need for constructing a long-term signature system on the user side and for performing operation, such as certificate management, time stamp acquisition, and expiration information acquisition.

CITATION LIST

Patent Literature

[PTL 1] JP-T-2003-533940

SUMMARY OF THE INVENTION

An object of the invention is to perform a long-term signature on a plurality of pieces of original data while retaining confidential information on the user side.

In order to attain the above-described object, according to a first aspect of the invention, a long-term signature terminal includes electronic signature data acquisition means for acquiring electronic signature data of a plurality of pieces of original data for each piece of original data, time stamp acquisition means for transmitting the acquired electronic signature data to a predetermined server and acquiring a time stamp issued for the electronic signature data from the predetermined server, verification information acquisition means for acquiring verification information for verifying the electronic signature data and the time stamp from a predetermined server, long-term signature target data acquisition means for acquiring long-term signature target data for confirming unfalsification of the original data, the electronic signature data, the time stamp, and the verification information for each piece of original data, and long-term signature data acquisition means for transmitting the acquired long-term signature target data to a predetermined server and acquiring long-term signature data having an archive time stamp issued for the long-term signature target data applied thereto.

According to a second aspect of the invention, in the long-term signature terminal according to the first aspect of the invention, the electronic signature data is subjected to an electronic signature with the same secret key for signature, and the time stamp is applied a time stamp with the same secret key for time stamp, and the verification information acquisition means acquires single verification information common to the plurality of pieces of original data.

According to a third aspect of the invention, the long-term signature terminal according to the first or second aspect of the invention further includes designation means for designating a long-term signature scheme for each piece of original data, in which the long-term signature data acquisition means acquires long-term signature data by the designated long-term signature scheme.

According to a fourth aspect of the invention, in the long-term signature terminal according to any one of the first to third aspects of the invention, at least two of the time stamp acquisition means, the verification information acquisition means, and the long-term signature data acquisition means perform communication with the same server.

According to a fifth aspect of the invention, a long-term signature server includes electronic signature data acquisition means for acquiring electronic signature data generated for each of a plurality of pieces of original data from a long-term signature terminal, time stamp acquisition means for transmitting the plurality of pieces of acquired electronic signature data to a time stamp server and acquiring a time stamp issued for each piece of electronic signature data from the time stamp server, time stamp transmission means for transmitting the acquired time stamp to the long-term signature terminal, verification information transmission means for collecting verification information of the acquired electronic signature data and time stamp from a predetermined server and transmitting the verification information to the long-term signature terminal, long-term signature target data acquisition means for acquiring long-term signature target data for confirming unfalsification of the original data, the electronic signature data, the time stamp, and the verification information generated for each piece of original data from the long-term signature terminal, and archive time stamp acquisition means for transmitting the acquired long-term signature target data to a time stamp server and acquiring an archive time stamp issued for each piece of long-term signature target data from the time stamp server.

According to a sixth aspect of the invention, in the long-term signature server according to the fifth aspect of the invention, the electronic signature data is subjected to an electronic signature with the same secret key for signature, and the time stamp is applied a time stamp with the same secret key for time stamp, and the verification information transmission means collects single verification information common to the plurality of pieces of original data and transmits the verification information to the long-term signature terminal.

According to a seventh aspect of the invention, a long-term signature terminal program causes a computer to realize an electronic signature data acquisition function of acquiring electronic signature data of a plurality of pieces of original data for each piece of original data, a time stamp acquisition function of transmitting the acquired electronic signature data to a predetermined server and acquiring a time stamp issued for the electronic signature data from the predetermined server, a verification information acquisition function of acquiring verification information for verifying the electronic signature data and the time stamp from a predetermined server, a long-term signature target data acquisition function of acquiring long-term signature target data for confirming unfalsification of the original data, the electronic signature data, the time stamp, and the verification information for each piece of original data, and a long-term signature data acquisition function of transmitting the acquired long-term signature target data to a predetermined server and acquiring long-term signature data having an archive time stamp issued for the long-term signature target data applied thereto.

According to an eighth aspect of the invention, a long-term signature server program causes a computer to realize an electronic signature data acquisition function of acquiring electronic signature data generated for each of a plurality of pieces of original data from a long-term signature terminal, a time stamp acquisition function of transmitting the plurality of pieces of acquired electronic signature data to a time stamp server and acquiring a time stamp issued for each piece of electronic signature data from the time stamp server, a time stamp transmission function of transmitting the acquired time stamp to the long-term signature terminal, a verification information transmission function of collecting verification information of the acquired electronic signature data and time stamp from a predetermined server and transmitting the verification information to the long-term signature terminal, a long-term signature target data acquisition function of acquiring long-term signature target data for confirming unfalsification of the original data, the electronic signature data, the time stamp, and the verification information generated for each piece of original data from the long-term signature terminal, and an archive time stamp acquisition function of transmitting the acquired long-term signature target data to a time stamp server and acquiring an archive time stamp issued for each piece of long-term signature target data from the time stamp server.

According to the invention, by cooperation of a terminal side and a server side, it is possible to perform a long-term signature while retaining confidential information on a user side.

BRIEF DESCRIPTION OF DRAWINGS

FIG. 3 is a diagram illustrating PAdES in detail.
FIG. 6 is a flowchart illustrating a second half of a procedure for generating long-term signature data.

DETAILED DESCRIPTION OF THE INVENTION (1) Outline of Embodiment

A long-term signature system 1 can generate long-term signature data for each of a plurality of pieces of original data in cooperation with a long-term signature server 2 while retaining original data and a secret key for signature in a client terminal 3 without sending original data and the secret key for signature to the outside.

In the long-term signature system 1, there are PAdES and XAdES as a long-term signature scheme, a scheme is designated for each piece of original data, and in a state where the plurality of schemes are mixed, long-term signature data can be generated in parallel.

In the long-term signature system 1, when using a plurality of long-term signature schemes simultaneously, in each long-term signature scheme, the secret key of a certificate authority issued a public key certificate paired with the secret key for signature is identical, and the secret key of a TSA certificate authority issued a public key certificate paired with a secret key for time stamp is also identical. Accordingly, verification information is common to all pieces of original data, and it is only necessary to process single verification information.

The long-term signature server 2 performs a complicated procedure, such as connection to other servers, whereby the connection target of the client terminal 3 can be concentrated on the long-term signature server 2.

In this way, in the long-term signature system 1, the long-term signature server 2 performs verification information acquisition, time stamp acquisition, certificate management (latest public key certificate and expiration information are constantly collected), and the like, and PAdES and XAdES can be created simultaneously.

(2) Details of Embodiment

Figure 1:
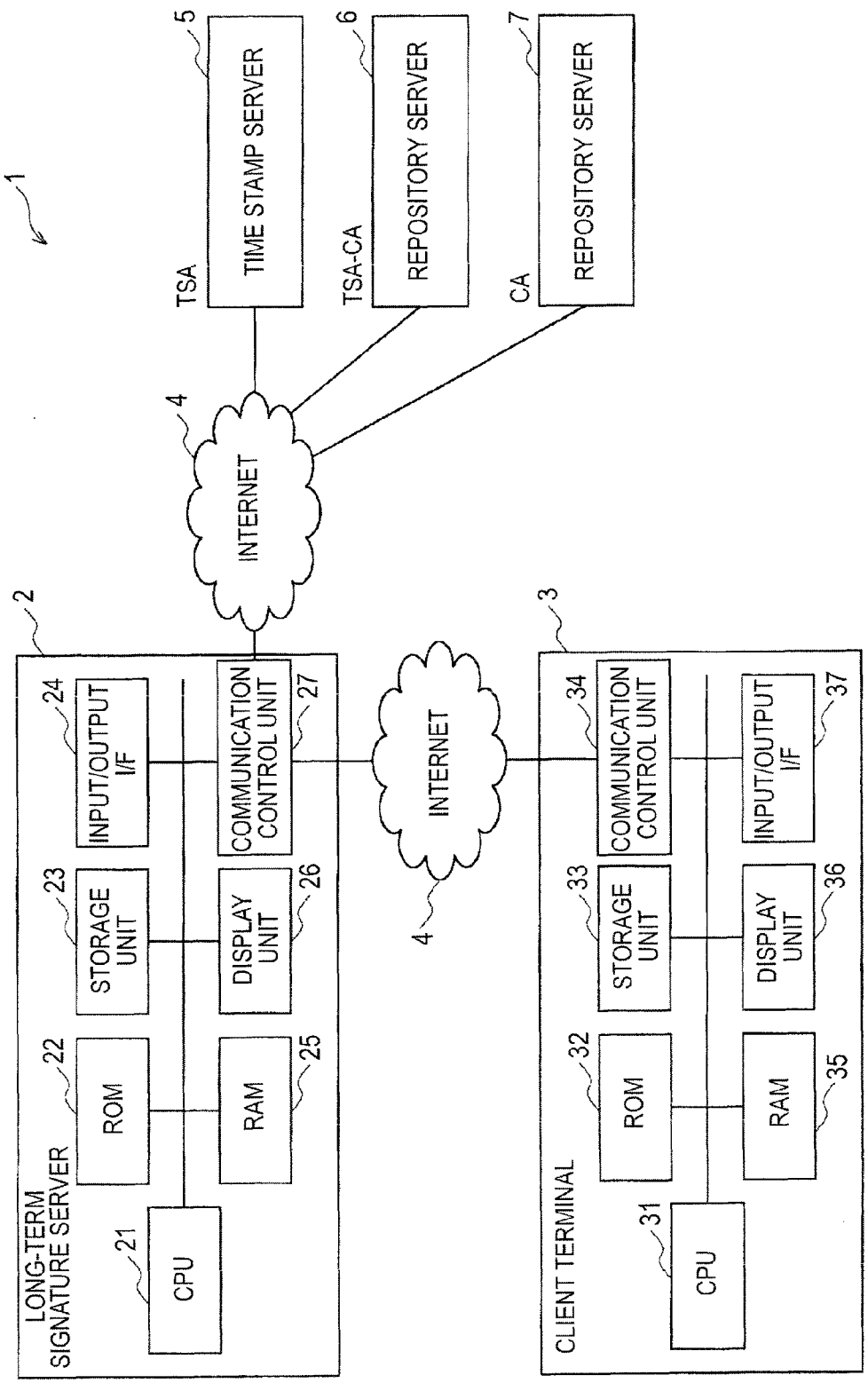
FIG. 1 is a diagram illustrating the configuration of a long-term signature system.

FIG. 1 is a diagram illustrating the configuration of a long-term signature system 1.

The long-term signature system 1 has a configuration in which a long-term signature server 2, a client terminal 3, a time stamp server 5, repository servers 6 and 7, and the like are connected to be communicable with each other through Internet 4.

The long-term signature server 2 has a central processing unit (CPU) 21, a read only memory (ROM) 22, a storage unit 23, an input/output I/F 24, a random access memory (RAM) 25, a display unit 26, a communication control unit 27, and the like.

The CPU 21 is a central processing unit which performs information processing or performs control of the respective units of the long-term signature server 2 according to a program stored in the storage unit 23 or the like.

In this embodiment, the CPU 21 creates long-term signature data in cooperation with the client terminal 3 while performing communication with the client terminal 3, the time stamp server 5, or the repository servers 6 and 7.

The ROM 22 is a read only memory and stores a basic program which is used to operate the long-term signature server 2, parameters, and the like.

The RAM 25 is a readable and writable memory and provides a work memory or the like which is used when the long-term signature server 2 performs communication with the client terminal 3 or the like to create long-term signature data.

The storage unit 23 is constituted by, for example, a high-capacity storage device, such as a hard disk, and stores an operating system (OS) which is used to operate the long-term signature server 2, a program which is used to generate long-term signature data, or the like.

The display unit 26 includes a display device using, for example, liquid crystal, a cathode ray tube (CRT), or the like and displays various screens which are used when a person in charge of operation of the long-term signature server 2 operates the long-term signature server 2.

The input/output I/F 24 includes an input/output device, for example, various operating switches, a keyboard, a mouse, and the like, and the person in charge of operation or the like can operate the long-term signature server 2 from the input/output I/F 24.

The communication control unit 27 performs communication with the client terminal 3, the time stamp server 5, the repository servers 6 and 7, and the like through Internet 4. Internet 4 may be a different form of communication network.

The client terminal 3 has a CPU 31, a ROM 32, a storage unit 33, a communication control unit 34, a RAM 35, a display unit 36, an input/output I/F 37, and the like.

The CPU 31 is a central processing unit which performs information processing or performs control of the respective units of the client terminal 3 according to a program stored in the storage unit 33 or the like.

In this embodiment, the CPU 31 performs transmission and reception of various kinds of information with respect to the long-term signature server 2, performs an electronic signature with a secret key, generates long-term signature data in cooperation with the long-term signature server 2, and the like.

The ROM 32 is a read only memory and stores a basic program which is used to operate the client terminal 3, parameters, and the like.

The RAM 35 is a readable and writable memory and provides a work memory when the client terminal 3 generates long-term signature data while performing communication with the long-term signature server 2.

The storage unit 33 is constituted by, for example, a high-capacity storage device, such as a hard disk, and stores an OS which is used to operate the client terminal 3, a secret key which is used to perform an electronic signature, a public key certificate of a public key corresponding to the secret key, original data to be subjected to a long-term signature, or the like.

A program which is used when the client terminal 3 creates long-term signature data may be downloaded from the long-term signature server 2 to the client terminal 3 each time of creating PAdES or may be stored in the storage unit 33 in advance and used.

The display unit 36 includes a display device using, for example, liquid crystal, a CRT, or the like and displays various screens which are used when the user of the client terminal 3 operates the client terminal 3.

The input/output I/F 37 includes an input/output device, such as a keyboard, a mouse, and an IC card reader/writer.

The IC card reader/writer is connected to an IC card and mediates communication between the client terminal 3 and the IC card.

The IC card is an information processing device including a CPU, a ROM, a RAM, an electrically erasable and programmable ROM (EEPROM), and the like and stores user authentication information for authenticating the user who uses the client terminal 3, or the like.

The secret key or the public key certificate may be stored in the IC card, and the client terminal 3 may perform an electronic signature using the secret key of the IC card.

The communication control unit 34 performs communication with the long-term signature server 2 through the Internet 4. Since the long-term signature server 2 performs communication with the time stamp server 5, the repository servers 6 and 7, or the like, the communication control unit 34 only has to access the long-term signature server 2.

The time stamp server 5 is a server which issues a time stamp, and is provided in a Time Stamping Authority (TSA).

The time stamp server 5 has an accurate timepiece which is corrected by the time to be distributed by a time distribution station, if electronic data for which a time stamp is to be issued is received, appends electronic data with the current date and time by the timepiece, and performs an electronic signature (encryption) with a secret key for time stamp to issue a time stamp. In this embodiment, a signature time stamp (STS), an archive time stamp (ATS), or a document time stamp (DTS) is issued.

The repository server 6 is a server which is provided in a time stamping authority certificate authority (TSA-CA: time stamp certificate authority), and provides expiration information (Certificate Revocation List (CRL)) of a public key certificate (a public key certificate of a public key corresponding to a secret key used in STS or ATS) for use in verification of a time stamp.

Since a public key certificate which is not listed up in the expiration information is not expired, it is thus possible to confirm the validity of the public key certificate and to confirm the validity of a time stamp by the valid public key certificate.

The repository server 7 is a server which is provided in a certificate authority (CA), and provides expiration information of a public key certificate for use in verification of an electronic signature performed by the client terminal 3 (a public key certificate of a public key corresponding to a secret key of the client terminal 3).

Since a public key certificate which is not listed up in the expiration information is not expired, it is thus possible to confirm the validity of the public key certificate and to confirm the validity of the electronic signature performed by the client terminal 3 by the valid public key certificate.

The expiration information which is provided by the repository server 6 and the repository server 7 is updated regularly or irregularly (for example, every 24 hours).

In the long-term signature system 1 described above, the roles of the client terminal 3 and the long-term signature server 2 are segregated, and long-term signature processing is performed in a cooperation manner by client-to-server communication.

Accordingly, it is possible to generate long-term signature data while retaining confidential information (original data and signature secret key) in the client terminal 3 without sending the confidential information to the outside.

In the long-term signature system 1, complicated processing, such as collection of a public key certificate or expiration information or management of connection information to each server, is performed by the long-term signature server 2, and the connection destination of the client terminal 3 can be concentrated on the long-term signature server 2.

Figure 2:
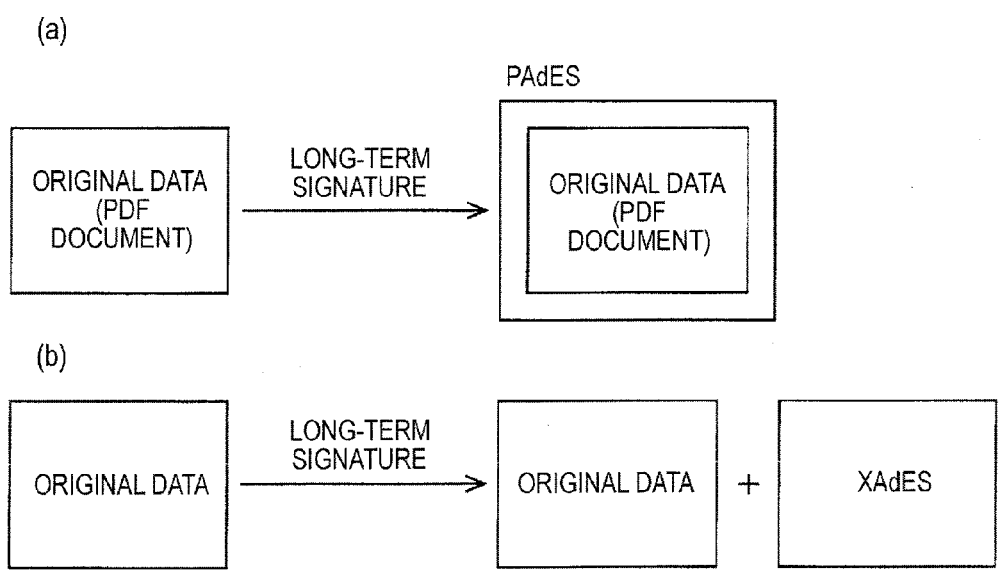
FIG. 2 is a diagram illustrating a type of long-term signature data which is used in this embodiment.

FIG. 2 is a diagram illustrating a type of long-term signature data which is used in this embodiment.

In this embodiment, as a long-term signature format, PDF advanced electronic signatures (PAdES) and XML advanced electronic signatures (XAdES) are used.

FIG. 2(*a*) is a conceptual diagram illustrating PAdES.

PAdES is a long-term signature format which is specified for document data (hereinafter, referred to as PDF document) in a portable document format (PDF).

PAdES is generated integrally with original data by applying an electronic signature, STS, verification information, ATS, and the like to a PDF document as original data.

FIG. 2(*b*) is a conceptual diagram illustrating XAdES.

XAdES is a long-term signature format, such as document data, image data, sound data, or motion image data, which is specified regardless of the type of original data. For a PDF document, a long-term signature by XAdES can be performed.

XAdES is constituted using an electronic signature, STS, expiration information, ATS, and the like, and is formed separately from original data.

FIG. 3 is a diagram illustrating PAdES in detail.

PAdES is the concept of an electronic signature which is created by European Telecommunications Standards Institute (ETSI), widely recognized in European Union, and suitable for an application including a human-readable document, and supplements the concept of two other electronic signatures, CMS advanced electronic signatures (CAdES) or XML advanced electronic signatures (XAdES), which are suitable for an application not including a human-readable document.

CAdES is an advanced electronic signature format in which STS is appended to an electronic signature, and there are various formats of CAdES-T, CAdES-C, and the like.

FIG. 3(*a*) shows the configuration of a long-term signature format by PAdES. In this drawing, the first generation PAdES is shown as PAdES (1st).

In PAdES, a PDF document which is original data to be stored is divided into PDF documents A and B, and CAdES is combined between the PDF documents A and B to put an electronic signature on the PDF document.

Hereinafter, original data to which an electronic signature is appended by combining CAdES between the PDF documents A and B is referred to as a signed PDF document.

The division location of the PDF document is recorded in tag information of PAdES.

In PAdES, of CAdES, CAdES-T with STS applied to an electronic signature is used.

CAdES data before signature is constituted using "reference information of a public key certificate" of a secret key to be used in an electronic signature and "original hash value (the hash value of original data), a public key certificate hash value (the hash value of the public key certificate)".

The public key certificate includes, for example, a public key, the owner of the public key, a certificate authority, the signature of the certificate authority, and the like.

CAdES-BES is constituted using CAdES data before signature and a signature value.

The signature value is a value which is obtained when an electronic signature is performed on "original hash value, public key certificate hash value" (or CAdES data before signature may be used) in CAdES-BES with the secret key of the user. With this signature value, original data is subjected to an electronic signature.

STS is a signature time stamp issued by the time stamp server 5 for "signature value" of CAdES-BES. Specifically, the signature value is the signature value which is obtained when the current date and time is applied to the hash value of the signature value, and an electronic signature is performed with the secret key for time stamp of the time stamp server 5.

PAdES is constituted by applying verification information and DTS to the signed PDF document configured as above. Here, since the first-generation DTS is applied, DTS (1st) is shown.

The verification information is constituted by a certificate group and an expiration information group for verifying the signature value or STS, and specifically, includes a certificate group, such as a public key certificate corresponding to a secret key used in an electronic signature or STS or a public key certificate on the authentication path, and an expiration information group (a list of expired public key certificates) of public key certificates.

If it is confirmed that the public key certificate corresponding to the secret key used in the electronic signature of the user or STS is not included in a list of expiration information groups, it is possible to confirm that these secret keys are valid, thereby verifying the validity of CAdES-T.

DTS (1st) is a time stamp which is issued for information (for example, the hash values of original data, the electronic signature, STS, the verification information, and the like, and hereinafter, referred to as long-term signature target data) for verifying unfalsification of original data, the electronic signature, STS, the verification information, and the like.

DTS (1st) is issued within the expiration date of the electronic signature of the user or STS.

For this reason, within the expiration date of DTS (1st), for example, even when the expiration date of the signature value of CAdES-T or STS has elapsed, or validity is lost within the expiration date, it is possible to secure unfalsification by DTS (1st), and thus, to verify unfalsification of original data.

FIG. 3 (*b*) is a diagram showing a case where the expiration date of long-term signature data is extended by the second-generation PAdES. In the drawing, the second-generation PAdES is shown as PAdES (2nd).

PAdES (2nd) is constituted by applying verification information of DTS (1st) and DTS (2nd) to PAdES (1st).

DTS (2nd) is the second-generation document time stamp, and is the time stamp which is issued for information (for example, the hash value of information having verification information of PAdES (1st) and DTS (1st) in combination) for verifying unfalsification of PAdES (1st).

DTS (2nd) has an expiration date longer than the expiration date of DTS (1st), and is issued for PAdES (1st) before the expiration date of DTS (1st) elapses.

For example, even when the expiration date of DTS (1st) has elapsed, or validity is lost within the expiration date, if DTS (2nd) is valid, it is possible to secure unfalsification of PAdES (1st).

Though not shown, the generations of PAdES can be further repeated to the third generation, the fourth generation, . . . .

In this way, in PAdES, before the latest ATS becomes invalid, DTS having an expiration date longer than the latest DTS is added and repeated through successive generations, thereby sequentially extending the expiration date of PAdES.

Figure 4:
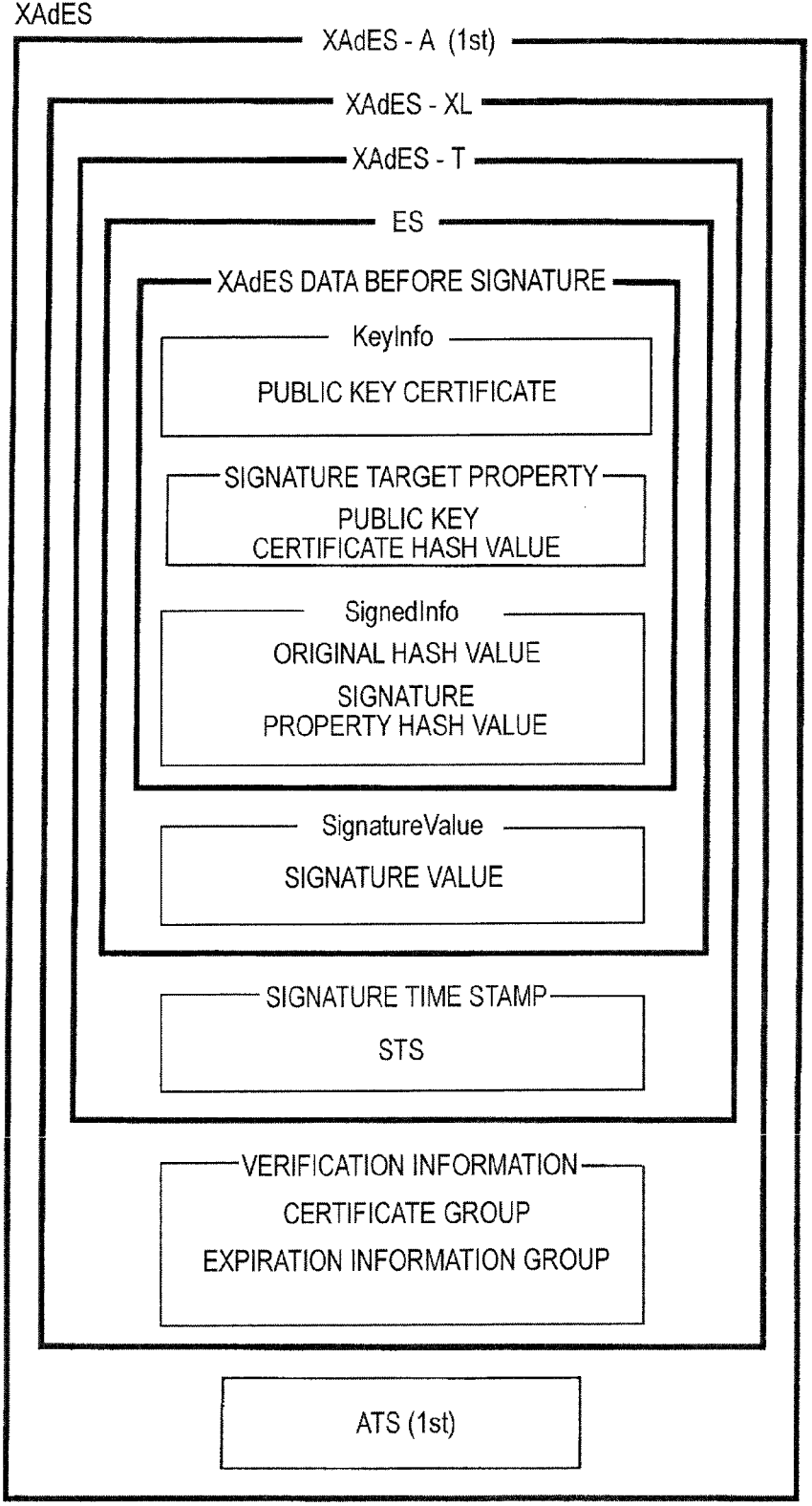
FIG. 4 is a diagram illustrating XAdES in detail.

FIG. 4 is a diagram illustrating XAdES in detail.

A long-term signature format by XAdES is constituted in the following manner using an extensible markup language (XML).

XAdES data before signature is an XML element which stores signature target data to be subjected to an electronic signature by the client terminal 3, and is constituted by elements of KeyInfo, signature target property, SignedInfo. The client terminal 3 performs an electronic signature on XAdES data before signature to generate XAdES-BES.

In KeyInfo, a public key certificate of a public key corresponding to a secret key used for an electronic signature by the client terminal 3 is set.

In the signature target property, a hash value of a public key certificate is set.

In SignedInfo, an original hash value and a signature property hash value (a hash value of the signature target program) are set.

XAdES-BES is constituted using XAdES data before signature described above and SignatureValue as elements.

In SignatureValue, the signature value when the client terminal 3 puts a signature on SignedInfo with the secret key is set.

In this way, the client terminal 3 performs an electronic signature on SignedInfo to put a signature on original data.

XAdES-T is constituted using XAdES-BES described above and a signature time stamp as elements.

In the signature time stamp, STS issued for XAdES-BES is set. The STS is obtained by giving the current date and time to the hash value of SignatureValue in the time stamp server 5 and performing an electronic signature with the secret key of the time stamp server 5.

XAdES-XL is constituted using XAdES-T described above and verification information as elements.

The verification information is constituted by a certificate group and an expiration information group for verifying a signature value and STS for use in XAdES-T, and is the same as PAdES.

XAdES-A (1st) is constituted using XAdES-XL described above and ATS (1st) as elements.

ATS (1st) is the first-generation ATS, and is the same as PAdES.

The verification of XAdES is performed in the same manner as PAdES. That is, XAdES-XL is verified by ATS (1st), XAdES-T is verified by the verification information, the signature value is verified by STS, and unfalsification of original data is verified by the signature value.

Although the first-generation XAdES is constituted as above, as in PAdES, ATS is applied to the second-generation ATS (2nd), the third-generation ATS (3rd), . . . , thereby extending the verifiable period.

Figure 5:
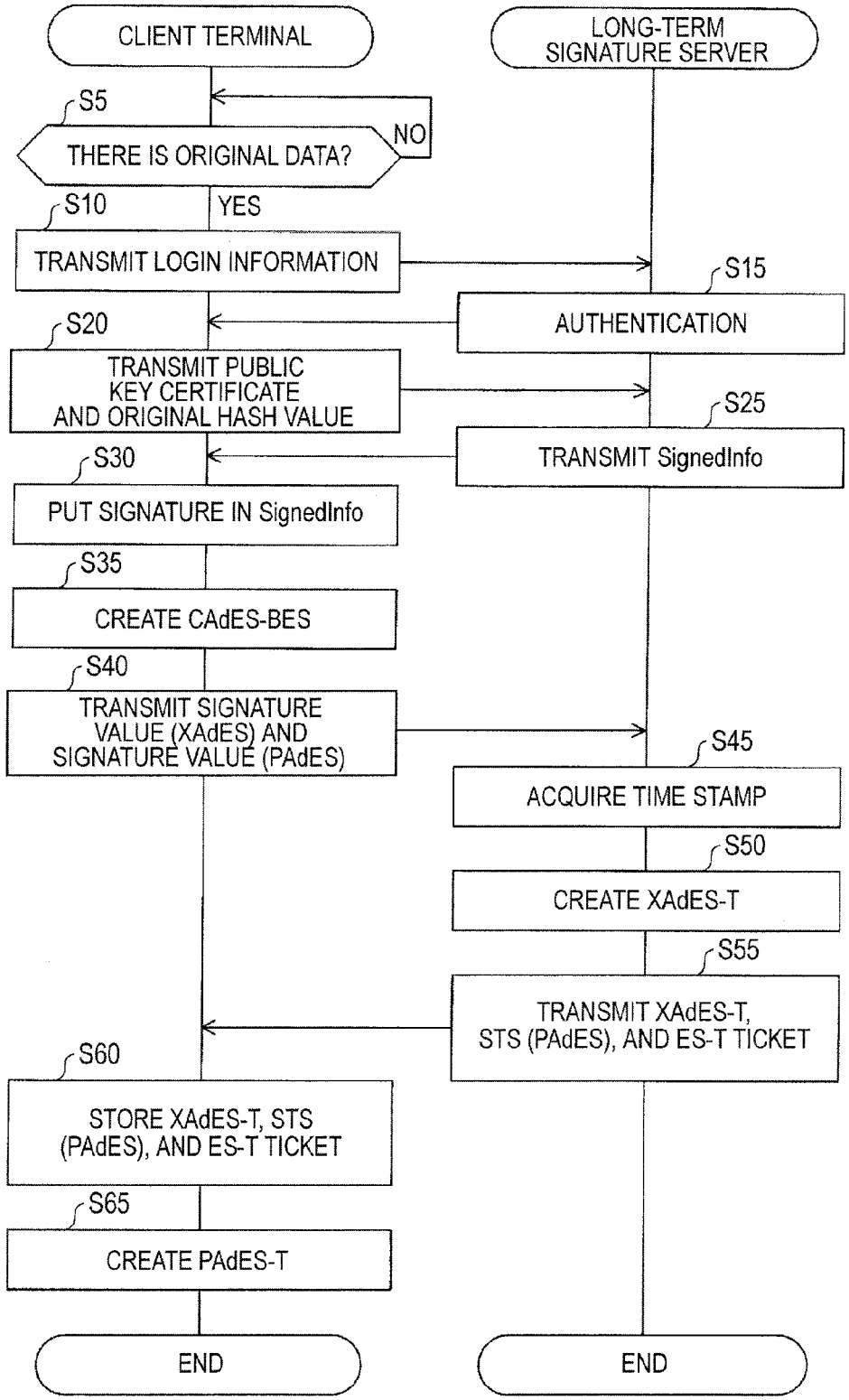
FIG. 5 is a flowchart illustrating a first half of a procedure for generating long-term signature data.

FIG. 5 is a flowchart illustrating a first half of a procedure for generating long-term signature data in the long-term signature system 1.

The following processing is performed by the CPU 31 of the client terminal 3 and the CPU 21 of the long-term signature server 2 according to a predetermined program.

In this embodiment, a case where PAdES and XAdES are mixed, and PAdES and XAdES are generated in parallel will be described.

In all cases, long-term signature data by PAdES and XAdES is created while retaining the secret key for signature of the user and original data in the client terminal 3 without sending the secret key for signature of the user and original data to the outside.

Processing common to PAdES and XAdES is commonalized, thereby simplifying the processing steps.

This embodiment may be applied to a case where PAdES and XAdES are not mixed, and only one long-term signature scheme is performed. In this case, the processing steps of the other long-term signature scheme can be omitted.

The number of pieces of original data is singular or plural, and for example, a long-term signature may be performed simultaneously for a combination of an arbitrary number of pieces of original data, for example, the number of pieces of original data for PAdES is three and the number of pieces of data for XAdES is five, or only the number of pieces of original data for PAdES is six.

In this way, in the long-term signature system 1, both PAdES and XAdES may be output by original data, or PAdES and XAdES may be switched.

First, the client terminal 3 monitors whether or not original data is stored in a directory (folder) in which original data to be subjected to a long-term signature is stored (Step 5).

When original data is not stored (Step 5; N), monitoring continues. When original data is stored (Step 5; Y), login information, such as a user name and a password, is transmitted to the long-term signature server 2 (Step 10).

In regard to the transmission of the login information, the login information may be stored in the client terminal 3 in advance and automatically transmitted, the client terminal 3 may read from an IC card which is loaded by the user, or a login screen may be displayed on the display unit 36, the user may input the login information, and the login information may be transmitted.

If the login information is received from the client terminal 3, the long-term signature server 2 authenticates the user using the login information to perform login processing, and transmits the effect of the completion of the login processing to the client terminal 3 (Step 15).

If the login processing is completed, the client terminal 3 designates a scheme which is used to perform a long-term signature for each piece of original data.

As a designation method, for example, the long-term signature schemes may be automatically allocated such that a PDF document is subjected to a long-term signature with PAdES, and data in a different format is subjected to a long-term signature with XAdES, the user may manually set the long-term signature scheme for each piece of original data, or an arbitrary method may be used.

Even when original data is not in a PDF format, original data may be applied to a dummy PDF background in the form of an attached file to generate PAdES, and simultaneously, XAdES may be generated.

The client terminal 3 computes the original hash value for each piece of original data generating XAdES, and transmits the public key certificate of the secret key for signature and the original hash value to the long-term signature server 2 (Step 20).

If the public key certificate and the original hash value are received from the client terminal 3, the long-term signature server 2 generates SignedInfo for each piece of original data using the public key certificate and the original hash value, and transmits SignedInfo to the client terminal 3 (Step 25).

If SignedInfo is received from the long-term signature server 2, the client terminal 3 performs an electronic signature with the secret key for signature for each piece of original data (Step 30).

The client terminal 3 generates CAdES data before signature from the reference information of the public key certificate, the hash value of the public key certificate, and the original hash value for original data generating PAdES, and performs an electronic signature on "original hash value, public key certificate hash value" in CAdES data before signature with the secret key for signature to create CAdES-BES (Step 35).

The client terminal 3 performs an electronic signature with the same secret key for a plurality of pieces of original data regardless of XAdES and PAdES.

Next, the client terminal 3 transmits the signature value (the signature value included in XAdES-BES) for XAdES and the signature value (the signature value included in CAdES-BES) for PAdES to the long-term signature server 2 (Step 40).

If these signature values are received, the long-term signature server 2 transmits these signature values to the time stamp server 5 to issue STS for each signature value, and receives and acquires STS for these signature values from the time stamp server 5 (Step 45).

The time stamp server 5 issues STS with a secret key paired with a TSA public key certificate issued with the same secret key of the TSA certificate authority for the signature values.

When access is concentrated on the time stamp server 5, and the long-term signature server 2 cannot access the time stamp server, the long-term signature server 2 may designate a standby time in the client terminal 3 (for example, 10 minutes), and access may be retried at the time designated by the client terminal 3.

In regard to XAdES, the long-term signature server 2 first creates XAdES-BES using the public key certificate, Signed-Info, and the signature value transmitted from the client terminal 3, and applies STS acquired from the time stamp server 5 to XAdES-BES to create XAdES-T (Step 50). The long-term signature server 2 stores the created XAdES-T in a predetermined directory.

The long-term signature server 2 determines a public key certificate and expiration information necessary for verification of the signature value and STS for use in the stored XAdES-T, accesses the repository servers 6 and 7 regularly, and collects the public key certificate and the expiration information.

In the long-term signature system 1, for PAdES and XAdES, an electronic signature is performed with the same secret key for signature, and STS is issued with the secret key for time stamp paired with the TSA public key certificate issued with the same secret key of the TSA certificate authority. For this reason, since verification information is common to all pieces of original data to be processed regardless of PAdES and XAdES, the long-term signature server 2 only has to generate single verification information and transmit the verification information to the client terminal 3. Accordingly, the generation of the verification information is facilitated, and the communication of the long-term signature server 2 and the client terminal 3 can be shared.

Next, the long-term signature server 2 transmits XAdES-T (the same as being stored in a predetermined folder), STS for PAdES, and the ES-T ticket to the client terminal 3 (Step 55).

In the ES-T ticket, information for designating the time at which the client terminal 3 starts subsequent processing, information for specifying PAdES or XAdES to be processed when the long-term signature server 2 restarts the subsequent processing, or the like is included.

The client terminal 3 receives and stores these kinds of information from the long-term signature server 2 (Step 60).

Next, the client terminal 3 generates PAdES-T for each piece of original data using STS for PAdES (Step 65).

With the above, the first-half processing ends, and the client terminal 3 pauses long-term signature data generation processing for the time designated by the ES-T ticket. The pause period is the time which is revised from the time for which the expiration information or the like is updated by the repository servers 6 and 7, and for example, about 24 hours.

The pause period is provided to get the time until the expiration information to be provided by the repository servers 6 and 7 is updated to the latest information. That is, when the client terminal 3 is subjected to an electronic signature or when the time stamp server 5 issues STS, it is intended to avoid a situation in which the expiration information or the like is not updated even though the public key certificate is expired intrinsically.

FIG. 6 is a flowchart illustrating a second half of a procedure for generating long-term signature data in the long-term signature system 1.

The client terminal 3 monitors whether or not a predetermined time designated by an ES-T ticket has elapsed (Step 100).

When the predetermined time has not elapsed (Step 100; N), the client terminal 3 continues monitoring.

When the predetermined time has elapsed (Step 100; Y), the client terminal 3 transmits login information to the long-term signature server 2 (Step 105).

If the login information is received from the client terminal 3, the long-term signature server 2 authenticates the user using the login information to perform login processing and transmits the effect of the completion of the login processing to the client terminal 3 (Step 110).

If the effect of the completion of the login processing is received from the long-term signature server 2, the client terminal 3 transmits the stored ES-T ticket to the long-term signature server 2 (Step 115).

If the ES-T ticket is received from the client terminal 3, the long-term signature server 2 confirms the ES-T ticket and recognizes either PAdES or XAdES for which the client terminal 3 proceeds processing.

Accordingly, the long-term signature server 2 specifies verification information which is used in PAdES and XAdES and transmits verification information to the client terminal 3 (Step 120).

If the verification information is received from the long-term signature server 2, the client terminal 3 applies the verification information to XAdES-T to generate XAdES-XL, thereby embedding the verification information.

The client terminal 3 adds the verification information to the signed PDF document to embed the verification information in PAdES before ATS (1st) is applied (Step 125).

Here, since the verification information is common to all pieces of original data to be processed at this time, it is only necessary to embed single verification information in PAdES and XAdES, thereby simplifying communication processing which is performed by the client terminal 3.

Next, the client terminal 3 generates long-term signature target data for each piece of original data from XAdES before ATS (1st) is applied and PAdES before DTS (1st) is applied, and transmits long-term signature target data to the long-term signature server 2 to request to acquire ATS (1st) and DTS (1st) (Step 130).

If long-term signature target data is received from the client terminal 3, the long-term signature server 2 transmits a time stamp request for long-term signature target data to the time stamp server 5, and receives a time stamp issued for each piece of long-term signature target data for the time stamp request from the time stamp server 5 to acquire ATS (1st) and DTS (1st) (Step 135).

For example, the time stamp request is performed by transmitting the hash value of long-term signature target data to the long-term signature server 2, or the like, and the acquisition of ATS (1st) and DTS (1st) is performed by applying the time stamp received from the time stamp server 5 to each piece of long-term signature target data.

Next, in regard to XAdES, the long-term signature server 2 applies the verification information and ATS (1st) to XAdES-T stored in a predetermined directory to generate XAdES-A (1st).

Next, the long-term signature server 2 transmits DTS (1st) for PAdES and XAdES-A (1st) to the client terminal 3 (Step 140).

In regard to XAdES, the client terminal 3 receives and stores XAdES-A (1st).

In regard to PAdES, DTS (1st) for PAdES is received and embedded in PAdES before DTS (1st) is applied, and the first-generation PAdES is generated and stored (Step 145).

With the embodiment described above, the following effects can be obtained.

(1) The client terminal 3 can generate long-term signature data by PAdES or XAdES without sending confidential information, such as a secret key or original data, for use in an electronic signature to the outside.

(2) An appropriate long-term signature format can be selected by original data, and evidence data (either or both of PAdES and XAdES) appropriate for complementability, viewability, or reusability can be created.

(3) The client terminal 3 does not need to access the time stamp server 5 and the repository servers 6 and 7 individually, and only has to access the long-term signature server 2 to generate long-term signature data by PAdES or XAdES.

(4) A secret key for signature and a secret key for STS are common to a plurality of pieces of original data to be processed, thereby commonalizing the verification information for these. In this way, since it is not necessary to create the verification information for each piece of original data, it is possible to reduce the number of times of communication between the client terminal 3 and the long-term signature server 2, thereby facilitating processing using the verification information.

(5) Since the long-term signature server 2 transmits single verification information to the client terminal 3, common processing is collected, thereby reducing the number of times of communication.

(6) Even when there is a change in access information, such as the uniform resource locators (URL) of the time stamp server 5 and the repository servers 6 and 7, the long-term signature server 2 copes with the change, and the client terminal 3 does not need to reset the access information.

(7) Since the long-term signature server 2 performs the complicated management of certificate documents, the management may not be performed on the client terminal 3 side.

(8) Since the communication of the client terminal 3 relating to a long-term signature is performed only with the long-term signature server 2, the setting of network security is simplified.

(9) The long-term signature server 2 can perform collection of verification information, acquisition of a time stamp, and certificate management.

(10) The long-term signature processing can be appropriately separated into a client side and a server side, and thus, the operation management of a public key certificate or a time stamp is performed on the server side, thereby reducing the burden on the user.

With the embodiment described above, the following configuration can be obtained.

The client terminal 3 processes a plurality of pieces of original data to be subjected to PAdES or XAdES.

In regard to PAdES, the client terminal 3 performs an electronic signature on CAdES data before signature to acquire a signature value, and in regard to XAdES, the client terminal 3 performs an electronic signature on XAdES data before signature to acquire a signature value.

For this reason, electronic signature data acquisition means for acquiring electronic signature data (signature value) of a plurality of pieces of original data for each original data is provided.

The client terminal 3 transmits the signature value to the long-term signature server 2, and the long-term signature server 2 transmits the signature value to the time stamp server 5 to issue STS.

In regard to CAdES, the long-term signature server 2 transmits STS to the client terminal 3, and in regard to XAdES, the long-term signature server 2 applies STS to XAdES-T, transmits the STS to the client terminal 3. The client terminal 3 receives the STS.

For this reason, the client terminal 3 includes time stamp acquisition means for transmitting the acquired electronic signature data to a predetermined server and acquiring a time stamp (STS) issued for the electronic signature data from the predetermined server.

In order to receive verification information for verifying a signature value or a time stamp from the long-term signature server 2, the client terminal 3 includes verification information acquisition means for acquiring verification information for verifying the electronic signature data and the time stamp from a predetermined server.

In order to generate long-term signature target data as information for confirming unfalsification of original data, a signature value, a time stamp, expiration information, and the like for CAdES or XAdES, the client terminal 3 includes long-term signature target data acquisition means for acquiring long-term signature target data for confirming unfalsification of the original data, the electronic signature data, the time stamp, and the verification information for each piece of original data.

The client terminal 3 transmits the hash value to the long-term signature server 2, and the long-term signature server 2 acquires ATS for the hash value from the time stamp server 5. In regard to PAdES, in order to receive ATS from the long-term signature server 2 and to generate PAdES using ATS to acquire long-term signature data, and in regard to XAdES, in order to receive XAdES with ATS applied thereto from the long-term signature server 2 to acquire long-term signature data, the client terminal 3 includes long-term signature data acquisition means for transmitting the acquired long-term signature target data to a predetermined server and acquiring long-term signature data having an archive time stamp issued for the long-term signature target data applied thereto.

In the long-term signature system 1, among the respective long-term signature schemes to be performed simultaneously, the secret key for signature is identical, and the secret key of the TSA certificate authority issued the public key certificate paired with the secret key for time stamp is identical, thereby commonalizing the verification information in each piece of long-term signature data. Accordingly, the electronic signature data is subjected to an electronic signature with the same secret key for signature, and the time stamp is applied a time stamp with the secret key for time stamp paired with the TSA public key certificate issued with the same secret key of the TSA certificate authority, and the verification information acquisition means acquires single verification information common to the respective long-term signature schemes.

In order to designate either PAdES or XAdES for generating long-term signature data for each piece of original data, the client terminal 3 includes designation means for designating a long-term signature scheme for each piece of original data, in which the long-term signature data acquisition means acquires long-term signature data by the designated long-term signature scheme.

The client terminal 3 performs communication with the long-term signature server 2 to generate long-term signature data. For example, since various modifications may be made such that access to the long-term signature server 2 is made to acquire STS and verification information, and access to the client terminal 3 is made to acquire ATS, or the like, at least two of the time stamp acquisition means, the verification information acquisition means, and the long-term signature data acquisition means perform communication with the same server.

In order to receive the signature value from the client terminal 3, the long-term signature server 2 includes electronic signature data acquisition means for acquiring electronic signature data generated for each of a plurality of pieces of original data from a long-term signature terminal.

In order to transmit a time stamp request for the acquired signature value to the time stamp server 5 to issue STS, the long-term signature server 2 includes time stamp acquisition means for transmitting a time stamp request for the plurality of pieces of acquired electronic signature data to a time stamp server and acquiring a time stamp issued for each piece of electronic signature data from the time stamp server.

In order that, in regard to PAdES, STS issued from the time stamp server 5 is transmitted to the client terminal 3 in the state of DTS, and in regard to XAdES, STS is applied to XAdES-BES and transmitted to the client terminal 3, the long-term signature server 2 includes time stamp transmission means for transmitting the acquired time stamp to the long-term signature terminal.

In order to collect verification information of the signature value and STS from the repository servers 6 and 7 to generate verification information, and to transmit the verification information to the client terminal 3, the long-term signature server 2 includes verification information transmission means for collecting verification information of the acquired electronic signature data and time stamp from a predetermined server and transmitting the verification information to the long-term signature terminal.

In order that the client terminal 3 generates long-term signature target data for confirming unfalsification of original data, the signature value, the time stamp, expiration information, and the like for CAdES or XAdES, and transmits long-term signature target data to the long-term signature server 2, and the long-term signature server 2 receives the long-term signature target data, the client terminal 3 includes long-term signature target data acquisition means for acquiring long-term signature target data for confirming unfalsification of the original data, the electronic signature data, the time stamp, and the verification information generated for each piece of original data from the long-term signature terminal.

In order to transmit the hash value to the time stamp server 5 and to receive ATS and DTS from the time stamp server 5, the long-term signature server 2 includes archive time stamp (and document time stamp) acquisition means for transmitting the acquired long-term signature target data to a time stamp server and acquiring an archive time stamp (and a document time stamp) issued for each piece of long-term signature target data from the time stamp server.

Since the signature value is made with the same secret key, and STS is also made with a secret key paired with a TSA public key certificate issued with the same secret key of the TSA certificate authority, in order to collect verification information common to a plurality of pieces of original data and to transmit the verification information to the client terminal 3, in the long-term signature server 2, the electronic signature data is subjected to an electronic signature with the same secret key for signature, the time stamp is applied a time stamp with a secret key for time stamp paired with a TSA public key certificate issued with the same secret key of the TSA certificate authority, and the verification information transmission means collects single verification information common to the plurality of pieces of original data and transmits the verification information to the long-term signature terminal.

The client terminal 3 executes a long-term signature terminal program to generate long-term signature data, the long-term signature terminal program causing a computer to realize an electronic signature data acquisition function of acquiring electronic signature data of a plurality of pieces of original data for each piece of original data, a time stamp acquisition function of transmitting the acquired electronic signature data to a predetermined server and acquiring a time stamp issued for the electronic signature data from the predetermined server, a verification information acquisition function of acquiring verification information for verifying the electronic signature data and the time stamp from a predetermined server, a long-term signature target data acquisition function of acquiring long-term signature target data for confirming unfalsification of the original data, the electronic signature data, the time stamp, and the verification information for each piece of original data, and a long-term signature data acquisition function of transmitting the acquired long-term signature target data to a predetermined server and acquiring long-term signature data having an archive time stamp issued for the long-term signature target data applied thereto.

The long-term signature server 2 executes a long-term signature server program to generate long-term signature data, the long-term signature server program causing a computer to realize an electronic signature data acquisition function of acquiring electronic signature data generated for each of a plurality of pieces of original data from a long-term signature terminal, a time stamp acquisition function of transmitting a time stamp request for the plurality of pieces of acquired electronic signature data to a time stamp server and acquiring a time stamp issued for each piece of electronic signature data from the time stamp server, a time stamp transmission function of transmitting the acquired time stamp to the long-term signature terminal, a verification information transmission function of collecting verification information of the acquired electronic signature data and time stamp from a predetermined server and transmitting the verification information to the long-term signature terminal, a long-term signature target data acquisition function of acquiring long-term signature target data for confirming unfalsification of the original data, the electronic signature data, the time stamp, and the verification information generated for each piece of original data from the long-term signature terminal, and an archive time stamp (and document time stamp) acquisition function of transmitting a time stamp request for the acquired long-term signature target data to a time stamp server and acquiring an archive time stamp and a document time stamp issued for each piece of long-term signature target data from the time stamp server.

REFERENCE SIGNS LIST

1: long-term signature system
2: long-term signature server
3: client terminal
4: Internet
5: time stamp server
6: repository server
7: repository server

The invention claimed is:

1. A long-term signature terminal comprising:
electronic signature data acquisition circuit for acquiring electronic signature data for each of a plurality of pieces of original data;
time stamp acquisition circuit for transmitting the acquired electronic signature data to a predetermined server and for acquiring a time stamp issued for the electronic signature data from the predetermined server;
verification information acquisition circuit for acquiring verification information for verifying the electronic signature data and the time stamp from a predetermined server;
long-term signature target data acquisition circuit for acquiring long-term signature target data for confirming unfalsification of the original data, the electronic signature data, the time stamp, and the verification information for each of the plurality of pieces of original data;
long-term signature data acquisition circuit for transmitting the acquired long-term signature target data to a predetermined server and for acquiring long-term signature data having an archive time stamp issued for the long-term signature target data applied thereto; and
designation circuit for designating a long-term signature scheme for each of the plurality of pieces of original data;
wherein the long-term signature data acquisition circuit acquires the long-term signature data in accordance with the designated long-term signature scheme; and
wherein at least two of the time stamp acquisition circuit, the verification information acquisition circuit, and the long-term signature data acquisition circuit perform communication with the same server.

2. The long-term signature terminal according to claim 1, wherein the electronic signature data is subjected to an electronic signature with the same secret key for signature, and the time stamp is applied a time stamp with the same secret key for time stamp; and wherein the verification information acquisition circuit acquires single verification information common to the plurality of pieces of original data.

3. A long-term signature server connected in communication with a long-term signature terminal according to claim 1, the long-term signature server comprising:
electronic signature data acquisition circuit for acquiring electronic signature data generated for each of a plurality of pieces of original data from the long-term signature terminal;
time stamp acquisition circuit for transmitting the acquired electronic signature data to a time stamp server and for acquiring a time stamp issued for the electronic signature data generated for each of the plurality of pieces of original data from the time stamp server;
time stamp transmission circuit for transmitting the acquired time stamp to the long-term signature terminal;
verification information transmission circuit for collecting verification information of the acquired electronic signature data and time stamp from a predetermined server and for transmitting the verification information to the long-term signature terminal;
long-term signature target data acquisition circuit for acquiring long-term signature target data for confirming unfalsification of the original data, the electronic signature data, the time stamp, and the collected verification information from the long-term signature terminal; and
archive time stamp acquisition circuit for transmitting the acquired long-term signature target data to a time stamp server and acquiring an archive time stamp issued for the acquired long-term signature target data from the time stamp server.

4. The long-term signature server according to claim 3, wherein the electronic signature data is subjected to an electronic signature with the same secret key for signature, and the time stamp is applied a time stamp with the same secret key for time stamp; and wherein the verification information transmission circuit collects single verification information common to the plurality of pieces of original data and transmits the verification information to the long-term signature terminal.

5. A non-transitory computer-readable storage medium having a long-term signature terminal program stored therein, the long-term signature terminal program, when executed, causing a computer to realize:
an electronic signature data acquisition function of acquiring electronic signature data of each of a plurality of pieces of original data;
a time stamp acquisition function of transmitting the acquired electronic signature data to a predetermined server and acquiring a time stamp issued for the electronic signature data from the predetermined server;
a verification information acquisition function of acquiring verification information for verifying the electronic signature data and the time stamp from a predetermined server;
a long-term signature target data acquisition function of acquiring long-term signature target data for confirming unfalsification of the original data, the electronic signature data, the time stamp, and the verification information for each of the plurality of pieces of the original data;
a long-term signature data acquisition function of transmitting the acquired long-term signature target data to a predetermined server and acquiring long-term signature data having an archive time stamp issued for the long-term signature target data applied thereto; and
a designation function of designating a long-term signature scheme for each of the plurality of pieces of original data;
wherein the long-term signature data acquisition function acquires the long-term signature data in accordance with the designated long-term signature scheme; and
wherein the long-term signature terminal program further causes the computer to perform communication of at least two of the time stamp acquisition function, the verification information acquisition function, and the long-term signature data acquisition function with the same server.

* * * * *